United States Patent [19]

Austin et al.

[11] 4,320,150
[45] Mar. 16, 1982

[54] LACTOSE-RICH ANIMAL FEED FORMULATIONS AND METHOD OF FEEDING ANIMALS

[75] Inventors: Paul R. Austin, Wilmington; John P. Zikakis, Townsend, both of Del.; Charles J. Brine, Skillman, N.J.

[73] Assignee: University of Delaware, Newark, Del.

[21] Appl. No.: 216,027

[22] Filed: Dec. 12, 1980

Related U.S. Application Data

[63] Continuation-in-part of Ser. No. 51,850, Jun. 25, 1979, abandoned.

[51] Int. Cl.³ .................. A23C 21/08; A23K 1/08; A23K 1/18
[52] U.S. Cl. .................. 426/2; 426/69; 426/71; 426/583; 426/635; 426/643; 426/648; 426/657; 426/807
[58] Field of Search ............ 426/69, 71, 72, 74, 426/580, 583, 588, 635, 643, 648, 657, 800, 801, 807, 2; 127/31; 536/18, 20, 53

[56] References Cited

U.S. PATENT DOCUMENTS

| | | | |
|---|---|---|---|
| 1,763,633 | 6/1930 | Simmons | 426/807 X |
| 2,694,640 | 11/1954 | Gyorgy et al. | 426/71 |
| 2,708,165 | 5/1955 | Gyorgy et al. | 426/71 |
| 2,710,806 | 6/1955 | Gyorgy et al. | 426/71 |
| 2,710,807 | 6/1955 | Gyorgy et al. | 426/71 |
| 2,783,148 | 2/1957 | Gyorgy et al. | 426/71 |
| 4,048,346 | 9/1977 | Stoller | 426/807 X |
| 4,057,655 | 11/1977 | Okada et al. | 426/807 X |

OTHER PUBLICATIONS

Patton et al., "In Vivo Digestibility Evaluation of Chitinous Materials", *Journal of Dairy Science,* vol. 58, 3-1975, pp. 397–403.

Schingoethe, "Whey Utilization in Animal Feeding: A Summary & Evaluation", *Journal of Dairy Science,* vol. 59, pp. 556–570, 1976.

Balloun et al., "The Effects of Whey & Yeast on Digestibility of Nutrients in Feather Meal", *Poultry Science,* vol. 53, pp. 1084–1095, 1974.

Rutledge, "Decalcification of Crustacean Meals", *J. Ag. & Food Chem.,* vol. 19, 1971, pp. 236–237.

*Primary Examiner*—Arthur L. Corbin

[57] ABSTRACT

Formulated animal feeds having excellent digestibility with high energy and good protein content based on lactose-rich whey products are produced by supplementation with small quantities of water insoluble poly-N-acetyl-$\beta$-D-glucosamine glycosides having a molecular weight of at least 5,000 and are fed to farm type animals. Most of the formulated feeds contain at least 7% lactose and up to 5% poly-N-acetyl-$\beta$-D-glucosamine glycoside in addition to the usual protein, fat, carbohydrate, vitamin and mineral constitutents of the feed. For poultry, which are among the least efficient metabolizers of lactose, such feeds may contain 5–25% lactose.

10 Claims, No Drawings

LACTOSE-RICH ANIMAL FEED FORMULATIONS AND METHOD OF FEEDING ANIMALS

The Government of the United States of America has rights in this invention pursuant to Grant No. 04-6-158-44025 awarded by the U.S. Department of Commerce.

This application is a continuation-in-part of U.S. Application Ser. No. 051,850 filed June 25, 1979, now abandoned.

This invention relates to animal food formulations and, more particularly, to the utilization of whey, a lactose-rich dairy by-product, in such formulations.

According to U.S. Department of Agriculture figures, the annual U.S. production of whey from cheese-making is about 13 billion kilograms (dried weight) of which only about 40% is utilized. The unused whey normally is disposed of into land-fill sites, streams and municipal sewage.

This product is a potentially valuable foodstuff; dried whey contains about 13% protein of high biological value, 1% fat, 8% minerals (primarily calcium and phosphorus), and almost 70% lactose. This very high quantity of lactose is the reason for the underutilization of whey as a nutrient, since most animals have difficulty in digesting lactose; that is, they tend to be lactose intolerant when the percentage of lactose in their feed exceeds their digestive tolerance limits.

Chitin, a poly-N-acetyl-$\beta$-D-glucosamine glycoside, is a by-product of the crustacean fishing industry, where it is found in crab and shrimp waste produced at the seafood processing plants. Chitin may be isolated from this waste by removal of the mineral salts and proteins to produce a polymer having a molecular weight of about 500,000 to over 2,000,000. Chitins of reduced molecular weight, e.g., 5,000 to 450,000, such as microcrystalline chitin and double-sheared chitin may also be produced from the higher molecular weight polymer. All of these polymer forms of chitin are insoluble in water and 2% acetic acid.

PRIOR ART

U.S. Pat. No. 2,694,640 granted Nov. 16, 1954, to György, Kuhn and Zilliken describes an infant food formulation containing cow's milk and a highly selective fraction of hydrolyzed chitin that is water soluble to increase the growth of *Lactobacillus bifidus* in the infant's intestinal track.

U.S. Pat. No. 2,710,807 granted June 14, 1955, to György, Kuhn and Zilliken describes incorporating "$\alpha$- and $\beta$-alkyl glucosides of N-acetyl-d-glucosamine" in infant feeding preparations to promote the growth of *Lactobacillus bifidus*. The compounds appear to be monomeric and the "$\beta$-methyl glucoside of N-acetyl-d-glucosamine" as prepared by Neuberger and Rivers, Jour. Chem. Soc., London, 1939, page 123, is water soluble. As it is stated on page 125 of this publication, the compound has an optical rotation of "$[\alpha]_D$-43°" in water". The patent also suggests the use of the compounds as ingredients in animal feeds.

U.S. Pat. No. 2,783,148 granted Feb. 26, 1957, to P. György, R. Kuhn and F. Zilliken, describes alcoholized chitin and milk-based food products containing the alcoholized chitin, which products are also water soluble, to improve the digestion of cow's milk. The formulations in these three patents were limited to the use of cow's milk itself and cows's milk solids containing only about 5% of lactose.

Patton, R. S. and P. T. Chandler, 1975, reported on the in vivo digestibility of chitinous materials (crab meal) by calves (J. Dairy Sci., 58, 397), but only cereal and leguminous proteins and common carbohydrates were employed in the feeds. Crab meal has long been used in poultry feed, limited, however, by its high calcium content.

Whey solids and other lactose-rich dairy products and by-products have been studied extensively as feeds for pigs and calves (Schingoethe, D. J., 1976. J. Dairy Sci., 59, 556), with a permissible amount ranging from 20-30% (14-20% lactose in the total diet) under the most favorable conditions. Poultry are very sensitive; the optimum amounts in the ration are small, ranging from 3-4% of dried whey (2.1-2.8% lactose in the total diet) (Balloun, S. L. and J. K. Khajeraen, 1974. Poult. Sci. 53: 1084). Since poultry are among the least efficient metabolizers of lactose-rich products (Allen, R. D. Feedstuffs Ingredient Analysis Table, 1979 Edition), higher amounts in the diet cause diarrhea, desiccation and limited weight gain.

OBJECTS

It is the object of this invention to provide lactose-rich animal foods that are digestible, highly nutritious and growth-promoting.

Another object is to incorporate whey products, such as dried whole whey, whey solids, condensed whey, and dried whey products, into animal feeds wherein the lactose content of the formulated food is 5–40%, and well above the normal digestive tolerance level for lactose of the animal to be fed.

A particular objective is to formulate an effective poultry feed based on lactose-rich whey products.

Further objects are to improve the digestion of whey, maximize the utilization of whey, and put both waste whey and chitin increasingly into the food chain.

SUMMARY OF INVENTION

Contrary to the teaching of the prior art, we have found that animal feeds can be fortified with whey products to a total lactose content which is above the normal digestive limit for lactose for the animal to be fed and provide digestible, high-energy and nutritious products if said fortified feeds are concomitantly supplemented with 0.5% to 5% of a water insoluble polymer based predominantly on N-acetyl-$\beta$-D-glucosamine glycoside. Preferred compositions are poultry feeds containing 5–25% of lactose from dried whole whey or whey solids and 0.5–5% of a chitinous polymer.

By the term lactose-rich whey products as used herein and in the claims, we mean whey products having a lactose content greater than 20% of the solid material, such as dried whole whey, condensed whey, and whey solids.

By the term "normal digestive tolerance limit for lactose", we mean a percent level of lactose in a feed, which feed is free of poly-N-acetyl-$\beta$-D-glucosamine glycosides, above which percent level of lactose the animal will develop signs of irritation of its digestive tract as evidenced, for example, by excess gas, bloating, diarrhea, or limited weight gain.

By the term "poly-N-acetyl-$\beta$-D-glucosamine glycoside" as used herein and in the claims, we mean oligomers and polymers of the molecular weight range of 5,000 to 2,000,000 or more that are insoluble in water and 2% acetic acid even though they may contain a few scattered free amine groups. These polymers include the oligomers derived, for example, by enzymatic cleavage of chitin as well as chitin itself. Chitin-protein complexes, which are also included within this definition, such as those found in crab and shrimp meal, exuviated carapaces, horseshoe crabs, crawfish and krill, are especially suited for promoting the digestion of lactose-rich dairy products. These chitinous oligomers and polymers are insoluble in water and in dilute acetic acid. Becuase of deleterious effects of salts on animals, decalcified crustacean meals are advantageous. Chitins isolated by alternate acid and alkali treatment of crustacean shell wastes have a molecular weight of about 500,000 to over two million and are useful in this invention. Micronized chitin (a highly sheared chitin, molecular weight of 350,000-450,000) and other medium molecular weight chitins such as microcrystalline chitin (molecular weight of 5,000 to 450,000) are especially effective. Chitin-protein concentrates (2-3% chitin, 58-59% protein) prepared by comminution and sieving of crab meal (J. E. Rutledge, 1971, Ag. & Food Chem., 19. 236) can be employed.

Care must be taken to adjust the amount of effective chitinous adjuvant in the final feed formulation depending on the chitin content of its source. With crustacean meals and exuviated carapaces, the chitin represents only 10-35% of the material.

The feedstuffs of this invention are suitable for a wide range of animals including both mono- and polygastric species. Porcine, bovine and avian animals are typical examples. Some formulations are suitable for human nutrition. Starting feeds for pigs, dogs, horses and calves can be formulated advantageously from lactose-rich whey products in conjunction with poly-N-acetyl-β-D-glucosamine glycoside adjuvants.

These novel feed components are specially suited for avian species, i.e., egg-laying birds and broiler chicks. While chickens are the most common avian species to be fed the new mixture, other species include turkeys, ducks and geese.

It is well-recognized in the industry that each animal has a characteristic digestive tolerance level or limit for lactose, and although there is considerable biological variation among individuals with respect to the property as well as wide variation in lactose-rich whey product quality, a range for each species has substantial significance (J. E. Fischer and T. S. Sutton, 1949, J. Dairy Sci. 32:139-163). Poultry are particularly sensitive; their digestive tolerance is only 3-4% of dried whey (2.1-2.8% lactose) as previously cited.

From the above generalized description, it will be understood that considerable variation in the subject feedstuffs both in amount and type is possible, depending importantly on the specific animal situation. In each case, however, substantially more than the normal digestive tolerance level of lactose may be employed in the animal food when an appropriate amount of poly-N-acetyl-β-D-glucosamine glycoside is used in conjunction with it.

Some animals may be fed lactose-rich whey products in conjunction with less refined poly-N-acetyl-β-D-glucosamine glycosides (chitinous) adjuncts, including crab and shrimp meals, chitin-protein complexes and the like. Care must be exercised to control salt content (calcium and magnesium carbonates and phosphates as well as sodium chloride) of the feeds, which may be deleterious to animal growth.

The following examples are to be considered as illustrative of the invention and not limiting said invention.

EXAMPLE I

Microcrystalline chitin was added as a supplement to lactose-rich chicken diets. The microcrystalline chitin was prepared by slurrying 150 g. of commercial chitin in 475 ml of 85% phosphoric acid and 1000 ml of 2-propanol, heating gradually with stirring for 2 hours and then quenching with 2000 ml of water. The slurry was centrifuged, the supernatant liquid was discarded and the chitinous product washed twice with hot water and once with acetone. Water was added and the slurry sheared in a Waring Blendor at about 20,500 R.P.M. The resulting emulsion was freeze-dried and the solid reground, first in the Waring Blendor and then in a Wiley mill. The final microcrystalline chitin was 40 mesh size, had a specific rotation of 33°, an average molecular weight of about 85,000 and a phosphorus content of 0.4%.

Four comparative experiments were carried out as outlined in Table 1 below.

TABLE 1

| | | Chick Diets | |
|---|---|---|---|
| Group | LFD | Diet Additives | Formulated Diet Lactose, % |
| A | 100% | None | 0 |
| B | 98% | 2% MCC | 0 |
| C | 80% | 20% Dried Whey | 13.6 |
| D | 78% | 20% Dried Whey 2% MCC | 13.6 |

LFD = Lactose-Free Diet (Standard Diet)
MCC = Microcrystalline Chitin

Each of the four test groups of Table 1 contained 5 male and 5 female one-day old plymouth rock chicks which were debeaked, vaccinated and assigned randomly. For the first 4 days, they were maintained on a commercial lactose-free standard diet. Water and diet for each group were provided ad libitum. All diets were isonitrogenous, isocaloric, and fortified with equal amounts of vitamins and trace mineral supplements. For the first 3 weeks, the chicks were maintained in heat-controlled brooder batteries and thereafter transferred into wire cages. The effect of the diet on the body weight of chickens is set forth in Table 2.

TABLE 2.

| Average Body Wts. of Chicks on Diets from Table 1 | | | | |
|---|---|---|---|---|
| Group/Days | 0 | 10 | 25 | 46 |
| A | 50 g | 154 g | 501 g | 1378 g |
| B | 49 | 156 | 522 | 1077 |
| C | 50 | 184 | 541 | 1178 |
| D | 51 | 190 | 615 | 1556 |

As can be seen from Table 2, average body weights of birds in group D with 20% dried whole whey (13.6 lactose) in their diet supplemented with 2% microcrystalline chitin grew faster than any other group. At 46 days the average body weight of birds in group D was 178 g higher than that of birds in the group A control receiving 100% standard diet, 479 g higher than birds of group B (microcrystalline chitin control), and 378 g higher than that of birds in the group C control on 20% whey. This is an impressive gain. Group C birds receiving only whey as an additive to their feed developed severe diarrhea and had scruffy feathers. Chicks in group D fed both whey and microcrystalline chitin supplement were diarrhetic at first but gradually became normal; the initial adjustment period apparently is needed to develop the bifidobacteria flora capable of handling the large amount of lactose in the whey.

At the end of the demonstration, necropsies were performed in all the birds. All internal organs of birds in group A were normal. The gall bladders of birds in group B were smaller than normally seen and their intestines were larger, even though these birds were smaller than those in group A. Approximately one-half of all birds in group C had intestinal hemorrhage. All birds in this group had large intestines and extremely large caecums. Birds in group D had larger livers and gall bladders than birds in group A. All gizzards in birds of group D peeled easily (a desirable characteristic), the skin was firm, and flesh under the peel was smooth. The meat of these birds had a good yellowish color. In general the meat of birds in group D, as well as their fat pad, contains less fatty material than that observed in the controls. The intestines of these birds were large and distended, suggesting vigorous ongoing fermentation.

EXAMPLE II

In this example, tests were carried out on broiler chicks as in Example I to compare microcrystalline chitin and a commercial double-sheared chitin as the chitinous supplements to the high-lactose whey solids diet. Double-sheared commercial chitin is prepared by first reducing it in particle size in dry form in a high-speed Waring Blendor. It is then ground in a Wiley mill to pass either 40 or 60 mesh seives. This double-sheared chitin has a molecular weight of 350,000–450,000.

Comparative experiments were carried out as outlined in Table 3 below which shows the diets employed and the average weight of each group of birds after 31 days (the duration of the trial.)

Initially, all groups of animals receiving whey in the diet developed diarrhea, those with either double-sheared chitin or microcrystalline chitin supplement had less diarrhea. By the end of the experiment, birds on whey without either supplement in the diet developed severe diarrhea while birds on whey with either supplement had mild diarrhea but gradually became normal. In addition, the supplements did not depress the appetite and all animals ate heartily.

TABLE 3

Chick Diets and Final Average Body Weights

| Group | LFD | Diet Additives | Average Body Weight After 31 Days |
|---|---|---|---|
| A | 100% | None | 988 g |
| B | 99% | 1% MCC | 935 g |
| C | 99% | 1% Double-Sheared Chitin | 935 g |
| D | 80% | 20% Dried Whole Whey | 794 g |
| E | 79% | 1% MCC 20% Dried Whole Whey | 1033 g |
| F | 78% | 2% MCC 20% Dried Whole Whey | 1087 g |
| G | 79% | 1% Double-Sheared Chitin 20% Dried Whole Whey | 1047 g |

LFD = Lactose-free Diet
MCC = Microcrystalline Chitin

These data indicate that both microcrystalline chitin and double-sheared chitin can improve the digestion of broiler rations containing large amounts of whey.

EXAMPLE III

To test the effectiveness of chitin and whey in a chicken feeding trial, a completely randomized block design of pens was used. Each of the four diet treatments contained three replicates (numbered 1 to 12 in Table 4) and each replicate contained 35 male one-day old white plymouth rock chicks (a broiler cross: Ross X Arbour Acre).

TABLE 4

Replicates of Chicken Diet Treatment Trials

| Diet Treatment | Replicates | Standard Ration % | Dried Whey % | Ground Chitin % |
|---|---|---|---|---|
| A | 1, 2, 3 | 100 | 0 | 0 |
| B | 4, 5, 6 | 98 | 0 | 2 |
| C | 7, 8, 9 | 80 | 20 | 0 |
| D | 10, 11, 12 | 78 | 20 | 2 |

All diets were made isonitrogenous, isocaloric, (3160 Kilocalories metabolizable energy per kilogram of diet) and fortified with equal amounts of vitamins and trace mineral supplements. Chitin (pharmaceutical grade) used in this experiment was purchased from Madera Products, Inc., Albany, Oreg., who isolated it from Tanner (Snow) [chionectes bairdi] crab shells. It was ground to 60 mesh and was found to have a molecular weight of 2,300,000 and an optical rotation of $[\alpha]_D = -35°$. The dried whey was acid whey, research grade, purchased from Gopez Milk Product Co. of Cincinnati, Ohio. It was a by-product of cheese manufacture and contained 73% lactose. None of the diets used contained coccidiostat. The chicks were raised in floor pens, each with 50 ft.$^2$ of floor area covered with dried peanut hulls and equipped with heat lamps, automatic waterers and cyclindrical hanging feeders.

The chicks were purchased from Allen's Hatchery (Seaford, Del.). They were sexed, debeaked, vaccinated for Merek's Disease, and identified by numbered wing bands. At 10 days of age, all birds were vaccinated for three viral diseases: New Castle, Infectious Bronchitis, and Infectious Bursa Disease. For the first 4 days, chicks were maintained on a commercial starting and growing dairy product-free diet (standard diet). Following this period, birds were placed in their respective experimental diets. Water and feed were provided ad libitum. The body weight of all birds were recorded at the start of the experiment and thereafter at 9, 24, and 44 days of age at which time the experiment was terminated. The results are given in Table 5 below.

The well being of the chicks was observed two to three times daily for the duration of the experiment. Samples of feces from each pen were collected fresh twice per week and examined for the presence of coccidia. This was done by mixing the collected feces with 15 ml phenol-sugar solution and strained through cheese cloth. The mixture was examined by light microscopy at 40×. No significant count of coccidia were found in any of the chickens. Substantially, all were coccidia free.

The amount of feed consumed was recorded for all replicates. At the end of the trial, 150 chickens collected randomly from certain pens, were dissected to check the vital organs (e.g., liver, heart, lungs, gall bladder, etc.) for any abnormalities.

The data in Table 5 indicate the progressive growth of birds from day one to day 44. The means of the body weight gain at day 44 were analyzed by oneway analysis of variance and found to be statistically highly significant (P<0.0005). Using the Dunkan multiple range and least significant difference tests, a check was made for any significant differences between diet treatments. When comparing diet treatment C (standard diet plus whey) against diet treatments A, B, and D, there was a highly significant difference (P<0.01) in all cases (Table 6). This establishes that chickens gained the least body weight in diet containing 80% standard ration plus 20% whey. In addition to the poor body gain, chickens in this diet treatment C suffered from severe diarrhea. Chickens in diet treatment D (78% standard diet, 20% whey, and 2% chitin) were initially diarrhetic but gradually they became normal, within 15-20 days in this diet. There was no statistical significant difference in weight gain between diet treatments A, B, and D.

TABLE 5

The Effect of Chitin and Whey on Weight Gain Obtained from a Chicken Feeding Trial

| Diet Treatment | WEIGHT[1] (GRAMS) | | | |
| --- | --- | --- | --- | --- |
| | 0 | 9 | 24 | 44 Days |
| A | 77 | 221 | 803 | 1739[2] |
| B | 75 | 229 | 823 | 1743[2] |
| C | 78 | 214 | 788 | 1680[2] |
| D | 78 | 246 | 831 | 1762[2] |

[1]These weights represent the means of each treatment.
[2]Oneway analysis of variance indicated that results are highly significant (P < 0.0005).

In order to compare the significance of one diet treatment with another, the Dunkan multiple range and LSD (Least Significant Difference) tests were performed. The results are reported in Table 6 below.

TABLE 6

Dunkan Multiple Range and LSD Tests Comparisons of Weight Gain Obtained with Various Treatments Tested

| DIET COMPARISON | WEIGHT GAIN (G) | DUNKAN AND LSD LEVEL OF SIGNIFICANCE |
| --- | --- | --- |
| SD + W VERSUS SD | 1680 VS. 1739 | 0.01 |
| SD + W VERSUS SD + C | 1680 VS. 1743 | 0.01 |
| SD + W VERSUS SD + C + W | 1680 VS. 1762 | 0.01 |

SD = Standard Diet;
W = 20% Whey;
C = 2% Chitin;
LSD = Least Significant Difference The important subjective observation made in the previous chicken feeding experiment (e.g., Example I) was that when the feed containing whey plus MCC is fed to chickens, the chickens had less body fat than chickens on standard diet. In this experiment, the amount of fat in the fat pad was measured. At the end of the experiment, 70 birds, (10 birds each from replicates 1, 3, 4, 5, 7, 11 and 12) were picked randomly for tests. These were dissected, the fat pads removed, and the weights recorded. The body weight of birds were matched with their fat pad weights and a ratio was determined, namely, the body weight divided by the fat weight in the fat pad. Table 7 below shows Dunkan multiple range test comparisons of mean ratios of body weight to fat (in the fat pad) with the various replicates. This test indicates that the combination of whey and chitin in the diet produced chickens with much less fat and at the same time gave better growth; the differences were highly significant (P<0.01) in comparisons between replicates 11 and 12 (two replicates from diet treatment D) and all other replicates. The results were not significant in replicates 11 versus 12, 1 versus 3, 4 versus 5, and 5 versus 7.

TABLE 7

Dunkan Multiple Range Test Comparisons of Mean Ratios of Body Weight to Fat with the Various Replicates

| REPLICATE COMPARISON | MEAN RATIO | LEVEL OF SIGNIFICANCE |
| --- | --- | --- |
| 12 VS. 1 | 125 VS. 52 | 0.01 |
| 12 VS. 3 | 125 VS. 51 | 0.01 |
| 12 VS. 4 | 125 VS. 66 | 0.01 |
| 12 VS. 5 | 125 VS. 71 | 0.01 |
| 12 VS. 7 | 125 VS. 78 | 0.01 |
| 12 VS. 11 | 125 VS. 107 | NS |
| 11 VS. 1 | 107 VS. 52 | 0.01 |
| 11 VS. 3 | 107 VS. 51 | 0.01 |
| 11 VS. 4 | 107 VS. 66 | 0.01 |
| 11 VS. 5 | 107 VS. 71 | 0.01 |
| 11 VS. 7 | 107 VS. 78 | 0.01 |
| 1 VS. 3 | 52 VS. 51 | NS |
| 4 VS. 5 | 66 VS. 71 | NS |
| 5 VS. 7 | 71 VS. 78 | NS |

NS = Not Significant

The overall conclusion from this experiment is that a diet containing 2% chitin, 20% whey, and 78% standard broiler ration has produced chickens with significantly less body fat without reduction in body weight from chickens growing in standard broiler ration.

It is apparent that changes and modificatons may be made without departing from the invention in its broader aspects. The aim of the appended claims, therefore, is to cover all such changes and modifications as fall within the true spirit and scope of the invention.

We claim:

1. An animal feed, formulated for feeding farm type animals containing a lactose-rich whey product in an amount that exceeds the normal digestive tolerance limit for lactose for the farm type animal to be fed and 0.5 to 5% by weight of the feed of a water insoluble poly-N-acetyl-$\beta$-D-glucosamine glycoside.

2. The formulated animal feed of claim 1 wherein the water insoluble poly-N-acetyl-$\beta$-D glucosamine glycoside is a chitinous polymer prepared by alternate acid and alkali treatment of crustacean shell.

3. The formulated animal feed of claim 1 wherein the water insoluble poly-N-acetyl-$\beta$-D glucosamine glycoside is microcrystalline chitin of a molecular weight of at least 5,000.

4. The formulated animal feed of claim 1 wherein the water insoluble poly-N-acetyl-$\beta$-D glucosamine glycoside is sheared chitin of a molecular weight of at least 350,000.

5. The formulated animal feed of claim 1 wherein said feed is a poultry feed containing a lactose-rich whey product in an amount to provide 5-25% lactose in said feed.

6. A method of feeding farm type animals lactose-rich animal feeds that are digestible, highly nutritious and growth-promoting comprising feeding said animals a formulated animal feed containing a lactose-rich whey product in an amount that exceeds the normal digestive tolerance limit for lactose for the animal being fed and 0.5 to 5% by weight of the feed of a water insoluble poly-N-acetyl-$\beta$-D-glucosamine glycoside.

7. The method of claim 6 wherein the water insoluble poly-N-acetyl-$\beta$-D-glucosamine glycoside is a chitinous polymer prepared by alternate acid and alkali treatment of crustacean shell.

8. The method of claim 6 wherein the water insoluble poly-N-acetyl-$\beta$-D-glucosamine glycoside is microcrystalline chitin of a molecular weight of at least 5,000.

9. The method of claim 6 wherein the water insoluble poly-N-acetyl-$\beta$-D-glucosamine glycoside is sheared chitin of a molecular weight of at least 350,000.

10. The method of claim 6 wherein said feed is a poultry feed containing a lactose-rich whey product in an amount to provide 5–25% lactose in said feed.

* * * * *